United States Patent
Low et al.

(10) Patent No.: US 10,243,988 B2
(45) Date of Patent: Mar. 26, 2019

(54) CONFIGURABLE NETWORK SECURITY

(71) Applicant: Trend Micro Incorporated, Tokyo (JP)

(72) Inventors: Stephen G. Low, Austin, TX (US);
James Rolette, Austin, TX (US);
Matthew Laswell, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 168 days.

(21) Appl. No.: 15/293,051

(22) Filed: Oct. 13, 2016

(65) Prior Publication Data

US 2017/0034207 A1    Feb. 2, 2017

Related U.S. Application Data

(63) Continuation of application No. PCT/US2014/034202, filed on Apr. 15, 2014.

(51) Int. Cl.
*H04L 29/06*    (2006.01)
*H04L 29/08*    (2006.01)

(52) U.S. Cl.
CPC ...... *H04L 63/1441* (2013.01); *H04L 63/0218* (2013.01); *H04L 63/1408* (2013.01); *H04L 63/1416* (2013.01); *H04L 67/10* (2013.01)

(58) Field of Classification Search
CPC .................................................. H04L 63/1441
See application file for complete search history.

(56) References Cited

U.S. PATENT DOCUMENTS

| | | | |
|---|---|---|---|
| 7,808,897 B1 | 10/2010 | Mehta et al. | |
| 9,558,352 B1* | 1/2017 | Dennison | G06F 21/552 |
| 2007/0280222 A1 | 12/2007 | Smith et al. | |
| 2008/0262991 A1* | 10/2008 | Kapoor | G06F 21/55 706/20 |
| 2009/0028045 A1 | 1/2009 | Stellenberg et al. | |
| 2010/0281539 A1* | 11/2010 | Burns | H04L 63/1441 726/23 |
| 2011/0055921 A1* | 3/2011 | Narayanaswamy | H04L 63/1458 726/22 |
| 2011/0099631 A1 | 4/2011 | Willebeek-Lemair et al. | |
| 2013/0219497 A1 | 8/2013 | Lukas et al. | |
| 2013/0343407 A1* | 12/2013 | Stroud | H04L 69/16 370/474 |

(Continued)

*Primary Examiner* — Simon P Kanaan
(74) *Attorney, Agent, or Firm* — Okamoto & Benedicto LLP

(57) ABSTRACT

According to an example, configurable network security may include receiving data flows directed to end node modules of a server, and selecting data flows from the received data flows based on an analysis of attributes of the received data flows. The selected data flows may be less than the received data flows. A number of IPS data plane modules of the server that are available for inspection of the selected data flows may be determined. The selected data flows may be distributed between the IPS data plane modules based on the determined number of the IPS data plane modules. The distributed data flows may be inspected using the IPS data plane modules to identify malicious and benign data flows, and to determine whether to drop the malicious data flows, direct the malicious data flows to a predetermined destination, or forward the benign data flows to the end node modules.

12 Claims, 9 Drawing Sheets

(56) References Cited

U.S. PATENT DOCUMENTS

2013/0347110 A1* 12/2013 Dalal ................. G06F 13/1652
  726/23

* cited by examiner

CONFIGURABLE NETWORK SECURITY

CROSS-REFERENCE TO RELATED APPLICATION

This application is a continuation of International Application No. PCT/US2014/034202, with an International Filing Date of Apr. 15, 2014, which is incorporated herein by reference in its entirety.

BACKGROUND

Typically, a dedicated hardware appliance implements specific workload processors on a fixed configuration printed wiring assembly. An example of a dedicated hardware appliance includes a fixed function intrusion prevention system (IPS) appliance. This purpose-built approach to dedicated hardware appliances provides reduction in the costs associated with such hardware appliances. This purpose built approach to dedicated hardware appliances also provides performance improvements compared to general purpose computers that a user may attempt to use for such specialized workloads.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
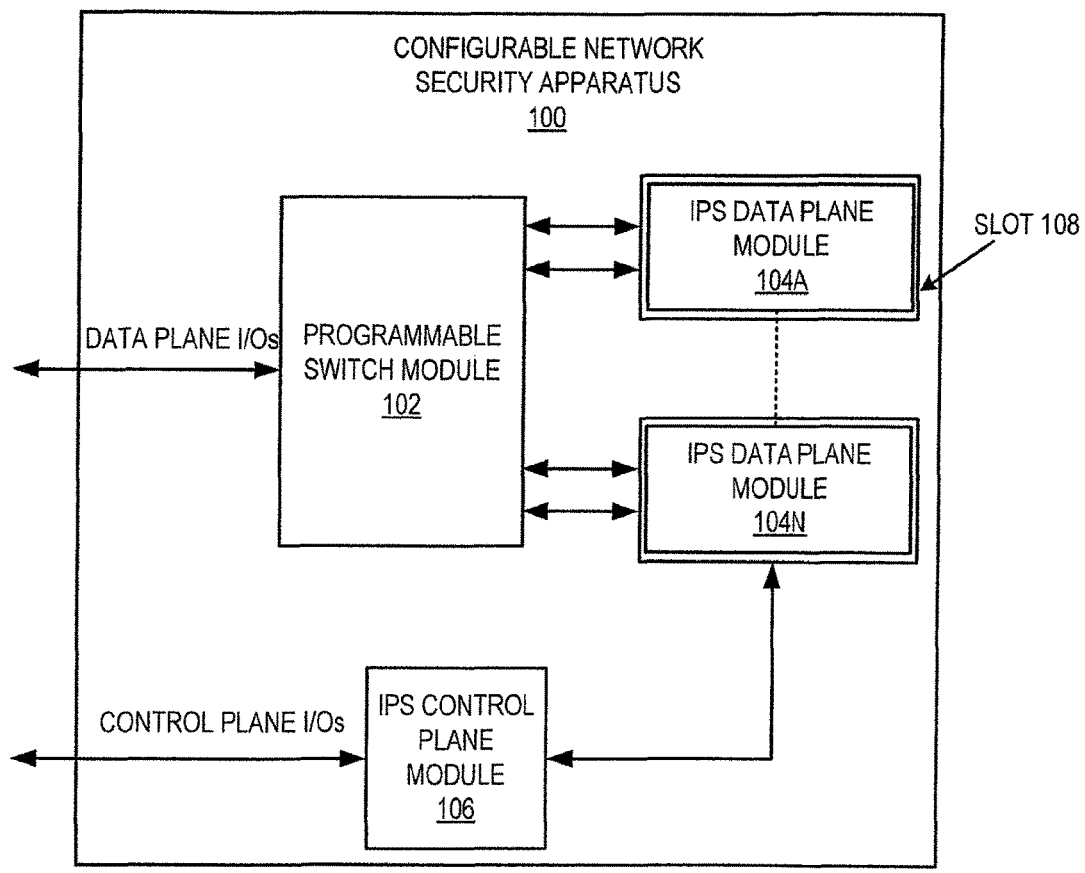
FIG. 1 illustrates an architecture of a configurable network security apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

With respect to dedicated hardware appliances, although such purpose-built appliances provide reduction in the costs associated with such appliances, and performance improvements compared to general purpose computers that a user may attempt to use for specialized workloads, such dedicated hardware appliances face challenges for certain types of traffic. For example, with respect to inspection of traffic between modules within a server, such traffic may need to be directed out of a server by a software (i.e., machine readable instructions) agent to dedicated hardware, and then routed back into the server. These aspects may add latency to processing of such traffic. Moreover, as traffic increases, the amount of traffic to be inspected may aggregate, and thus add further latency to processing of such traffic.

According to examples, a configurable network security apparatus and a method for configurable network security are disclosed herein. The apparatus and method disclosed herein provide for high performance, scalable, and distributed network security functionality. The high performance, scalable, and distributed network security functionality may be implemented into the switching fabric of a server. The configurable network security apparatus may include modules that are formed as removable cartridges and are interconnected by a switched fabric in a server chassis. For example, the configurable network security apparatus includes an IPS data plane module that includes a field programmable gate array (FPGA) and a network processing unit (NPU) for a data plane, and a central processing unit (CPU) for a control plane. The data plane may generally constitute the area of the apparatus where security is being applied to the traffic that is flowing through the apparatus. The control plane may provide, for example, monitoring of the apparatus, application of rules to the data plane traffic, responding to user requests, etc. Generally, the data plane may provide for processing of packets and the control plane may provide management related to the processing. The CPU for the control plane may represent an IPS control plane module. According to another example, the configurable network security apparatus includes a plurality of IPS data plane modules for the data plane, and an IPS control plane module for the control plane.

Regardless of the type of network security functionality being realized, or the particular types of modules that are used to implement the configurable network security apparatus, the configurable network security apparatus may be integrated into the backplane of a server. For the configurable network security apparatus, the data plane bandwidth may be scaled using a programmable switch module (e.g., a switch based load balancer) to distribute packet flows to the IPS data plane modules. For example, the load balancer is a hash based mechanism. The number of IPS data plane modules may be scaled from a single pair to effectively filling all available module slots in the chassis of a server.

The programmable switch module may intercept particular data flows based, for example, on attributes such as source, destination, virtual local area network (VLAN), or other qualifiers. A data flow may include any flow of information (e.g., packets of data) between a source and a destination. The programmable switch module may redirect the intercepted data flows for inspection by the IPS data plane modules. Data flow (also referred to as traffic) that does not contain attacks (e.g., does not contain packets of data that contain attacks) may be passed transparently to its original destination (e.g., an end node module of a server). Such data flow that does not contain attacks may be designated as benign data flow. Data flow that contains attacks may be designated as malicious data flow. The malicious data flow may be blocked, or passed to the IPS control plane module for other specified actions.

According to an example, a configurable network security apparatus includes a processor, and a plurality of IPS data plane modules for a data plane of the configurable network security apparatus. The IPS data plane modules may be executed by the processor to provide network security for a server that includes the configurable network security apparatus implemented into a switching fabric of the server. According to an example, the IPS data plane modules are implemented in the server. For example, the IPS data plane modules are installed in slots of the server chassis. The configurable network security apparatus may further include a control plane module for a control plane of the configurable network security apparatus. The control plane module may be executed by the processor to determine a number of the IPS data plane modules. The configurable network security apparatus may further include a programmable switch module that is executed by the processor to receive data flows directed to end node modules of the server, to select data flows from the received data flows based on an analysis of attributes (e.g., source, destination, VLAN, and/or other qualifiers) of the received data flows, and to distribute the selected data flows between the IPS data plane modules based on the determined number of the IPS data plane modules. According to an example, the programmable switch module implements load balancing functionality to distribute the selected data flows between the IPS data plane modules. According to an example, the IPS data plane modules inspect the distributed data flows to identify malicious and benign data flows, and determine whether to drop the malicious data flows, direct the malicious data flows to a predetermined destination (e.g., to the control plane module for further processing), or forward the benign data flows to the end node modules of the server. According to an example, the distributed data flows that are not dropped are routed from the IPS data plane modules via the programmable switch module to the predetermined destination or to the end node modules of the server.

According to an example, a method for configurable network security includes receiving data flows directed from one end node module of a server to another end node module of the server (e.g., end node modules that are implemented in the server chassis), selecting data flows from the received data flows based on an analysis of attributes of the received data flows, and determining a number of IPS data plane modules of the server that are available for inspection of the selected data flows between the end node modules of the server. According to the example, the method for configurable network security includes distributing the selected data flows between the IPS data plane modules based on the determined number of the IPS data plane modules, and inspecting the distributed data flows using the IPS data plane modules to identify malicious and benign data flows, and to determine whether to drop the malicious data flows, direct the malicious data flows to a predetermined destination, or forward the benign data flows to the other end node module of the server.

According to an example, a non-transitory computer readable medium includes stored thereon machine readable instructions to provide configurable network security. The machine readable instructions, when executed, cause a processor to receive data flows directed to end node modules of a server, and select data flows from the received data flows based on an analysis of attributes of the received data flows. The selected data flows may be less than the received data flows. According to an example, the machine readable instructions, when executed, further cause the processor to determine a number of IPS data plane modules of the server that are available for inspection of the selected data flows, and distribute the selected data flows between the IPS data plane modules based on the determined number of the IPS data plane modules. According to an example, the machine readable instructions, when executed, further cause the processor to inspect the distributed data flows using the IPS data plane modules to identify malicious and benign data flows, and to determine whether to drop the malicious data flows, direct the malicious data flows to a predetermined destination, or forward the benign data flows to the end node modules of the server. According to an example, the machine readable instructions, when executed, further cause the processor to drop the malicious data flows or direct the malicious data flows to the predetermined destination based on the inspection of the distributed data flows, and forward the benign data flows to the end node modules of the server based on the inspection of the distributed data flows.

The apparatus and method disclosed herein provide for scalability, in that, as the load for a server including the configurable network security apparatus increases, a user may add additional IPS data plane modules to accommodate the load. Thus, by adding additional IPS data plane modules to accommodate increased load, inspection throughput of traffic may be increased. Further, for users whose servers are lightly loaded, such users may implement a relatively fewer number of the IPS data plane modules, thus also reducing cost associated with an overall server. In this manner, the apparatus and method disclosed herein provide inspection bandwidth ranging from a few gigabits per second up to hundreds of gigabits per second based on the particulars of a configuration.

The apparatus and method disclosed herein provide tracking of cost associated with each server configuration that includes the configurable network security apparatus. Overall cost of servers that include the configurable network security apparatus may be reduced based on the ability to replace an IPS data plane module.

The apparatus and method disclosed herein provide a platform that may be shared by other functions. For example, any available slots in a server may be used for other modules to perform other functions. The apparatus and method disclosed herein also provide economic distributed, chassis-level security protection. For example, the security protection is based on a number of the IPS data plane modules that are used. The apparatus and method disclosed herein also provide the ability to inspect traffic between server modules with low latency, and without adding additional load to the server modules. For example, since traffic does not have to be routed from a server to a dedicated hardware appliance, traffic to or between server modules may be inspected as described herein.

FIG. 1 illustrates an architecture of a configurable network security apparatus (hereinafter also referred to as "apparatus 100"), according to an example of the present disclosure. Referring to FIG. 1, the apparatus 100 is depicted as including a programmable switch module 102 to distribute traffic to a plurality of IPS data plane modules 104A-104N. According to an example, the IPS data plane modules 104A-104N are removable.

The programmable switch module 102 may receive data flows directed to end node modules of a server that includes the configurable network security apparatus 100 implemented into a switching fabric of the server, as described with reference to FIG. 6. The programmable switch module 102 may analyze the data flows based on attributes of the data flows, and redirect the data flows for processing by one of the IPS data plane modules 104A-104N based on the analysis. The attributes include, for example, source, destination, virtual local area network (VLAN), and/or other qualifiers.

The programmable switch module 102 may redirect a subset of the data flows based on the analysis for processing by the IPS data plane modules 104A-104N. Further, the programmable switch module 102 may prevent a remaining subset of the data flows from being directed to the IPS data plane modules 104A-104N.

The programmable switch module 102 may provide support for customer input/output, aggregation, and multiplexing related to the IPS data plane modules 104A-104N. The programmable switch module 102 may provide VLAN translation. The programmable switch module 102 may provide hitless reboot and upgrade capabilities. The programmable switch module 102 may generate sFlow records, and forward the records to an IPS control plane module 106 as described herein.

The IPS data plane modules 104A-104N may each include a network processing unit (NPU), and a field-programmable gate array (FPGA). The NPU functions, for example, as a packet processor to perform pattern matching, key lookup, computation, data bitfield manipulation, queue management, control processing, and quick allocation and re-circulation of packet buffers. The FPGA may be configured by a user, for example, by manipulating the programmable logic components of the FPGA as needed.

The IPS data plane modules 104A-104N may be interconnected by a switched fabric in a general purpose chassis of a server, as described with reference to FIG. 6. The IPS data plane modules 104A-104N may be provided in a cartridge configuration for insertion in slots 108 provided in the chassis for each workload optimized module. The slots 108 may correspond to slots provided in a server chassis, as described with reference to FIG. 6

The apparatus 100 may use the IPS control plane module 106 (e.g., a CPU) for a control plane, and the IPS data plane modules 104A-104N for a data plane. The CPU may perform the instructions of a computer program for management of the IPS data plane modules 104A-104N by performing general arithmetic, logical, and input/output operations. The IPS control plane module 106 may provide dedicated management of the IPS data plane modules 104A-104N to implement the network security functionality.

The modules and other elements of the apparatus 100 may be machine readable instructions stored on a non-transitory computer readable medium. In addition, or alternatively, the modules and other elements of the apparatus 100 may be hardware or a combination of machine readable instructions and hardware.

The data plane bandwidth may be scaled using the programmable switch module 102 as a load balancer to distribute packet flows to the IPS data plane modules 104A-104N. The number of the data plane IPS data plane modules 104A-104N may be scaled from a single pair to effectively filling all available slots 108 in the chassis.

Figure 2:
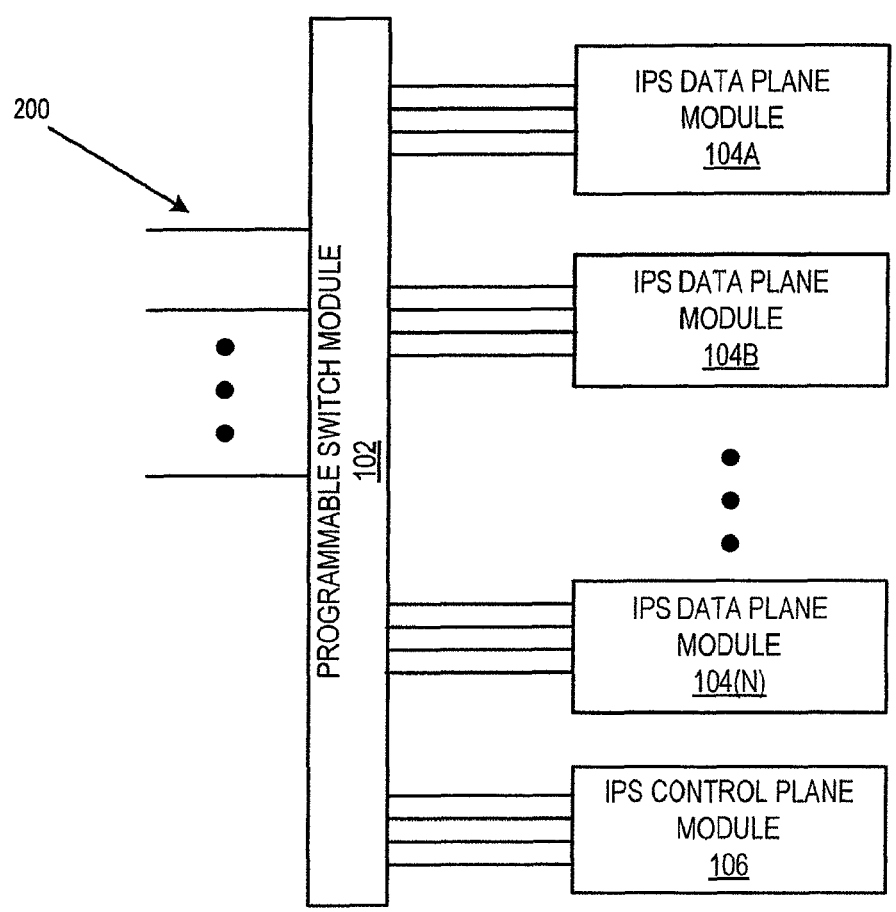
FIG. 2 illustrates IPS switch connectivity of the configurable network security apparatus, including a plurality of removable IPS data plane modules, according to an example of the present disclosure.

FIG. 2 illustrates IPS switch connectivity of the configurable network security apparatus 100, including a plurality of removable IPS data plane modules 104A-104N, according to an example of the present disclosure. The programmable switch module 102 may provide IPS switch connectivity by hashing on a set of fields (i.e., attributes) of packets inbound on uplinks 200. For example, the programmable switch module 102 provides IPS switch connectivity by hashing on attributes that include, for example, source, destination, VLAN, and/or other qualifiers. The IPS control plane module 106 may include an endpoint connection to the programmable switch module 102.

The IPS data plane modules 104A-104N may separate incoming packets of the data flows, for example, into three categories. For example, the IPS data plane modules 104A-104N separate incoming packets of the data flows into a known approved category that includes packets that show no signs of containing attacks, and forward the approved category packets to their intended destinations. For example, the IPS data plane modules 104A-104N separate incoming packets of the data flows into a known disapproved category that includes packets that are to be dropped, and drop the disapproved category packets. For example, the IPS data plane modules 104A-104N separate incoming packets of the data flows into a suspicious category that includes packets that need further inspection, and forward the suspicious category packets to the IPS control plane module 106 for further analysis.

According to an example, the data flows received and/or intercepted and redirected by the programmable switch module 102 and the IPS data plane modules 104A-104N may also be managed by software-defined networking (SDN) networks. Data flows that pass the inspection by the IPS data plane modules 104A-104N may be passed transparently to their original destination. For example, data flows that pass the inspection may be passed transparently to the appropriate end node module, as described with reference to FIG. 6. Data Flows that do not pass the inspection may be blocked. Alternatively, data flows that do not pass the inspection may be passed to the IPS control plane module 106 for other specified actions.

Figure 3:
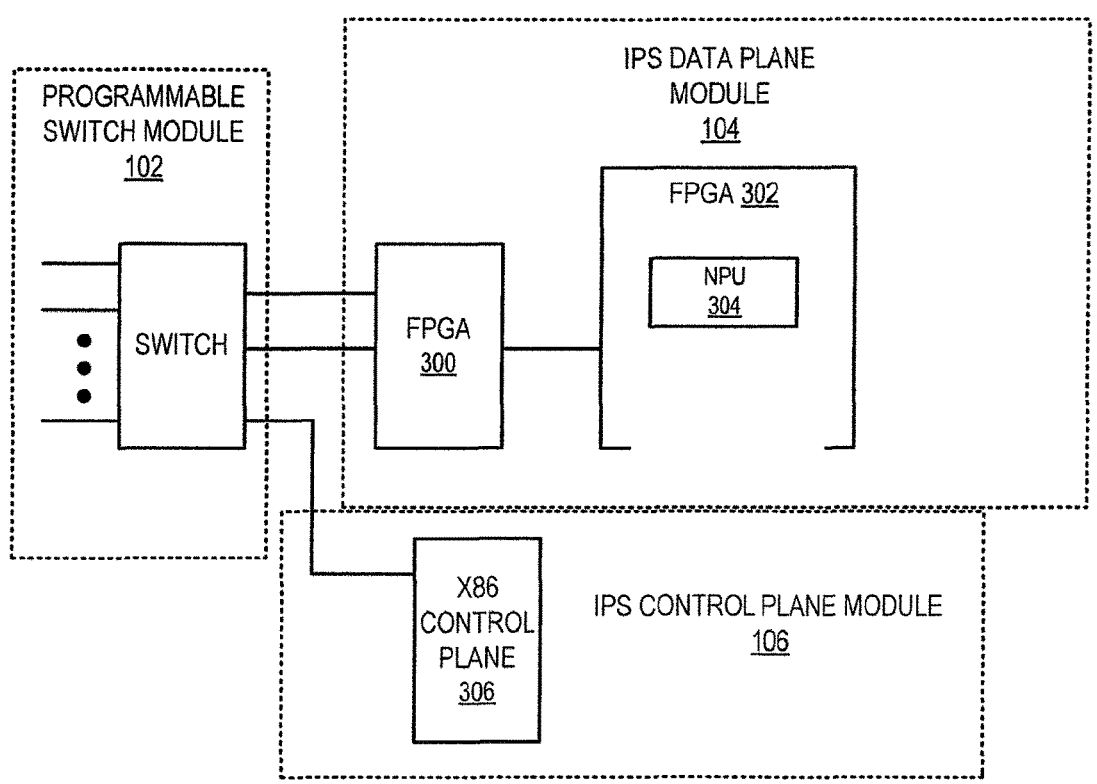
FIG. 3 illustrates further details of IPS logic partitioning of the configurable network security apparatus, including further details of a removable IPS data plane module, according to an example of the present disclosure.

FIG. 3 illustrates further details of IPS logic partitioning of the configurable network security apparatus 100, including further details of the IPS data plane module 104 (e.g., one of the IPS data plane module 104A-104N), according to an example of the present disclosure. The IPS data plane module 104 may include FPGAs 300, and 302, and NPU 304. The FPGAs 300 and 302 may provide for hardware offload and acceleration. For example, the FPGAs 300 and 302 loop back traffic in case of failure of the IPS control plane module 106. The FPGA 302 may provide load balancing of data flows to the NPU 304, and related multiplexing. The FPGAs 300 and 302 may also provide for inspection bypass of traffic. For example, the programmable switch module 102 may receive and/or intercept particular data flows based on attributes such as source, destination, VLAN, and/or other qualifiers, and redirect the data flows for inspection by the IPS data plane modules 104A-104N, or to the IPS control plane module 106.

For the example of FIG. 3, the NPU 304 may operate as the IPS engine that executes any machine readable instructions for the IPS functionality. For the example of FIG. 3, the IPS control plane module 106 includes a x86 control plane processor 306.

Figure 4:
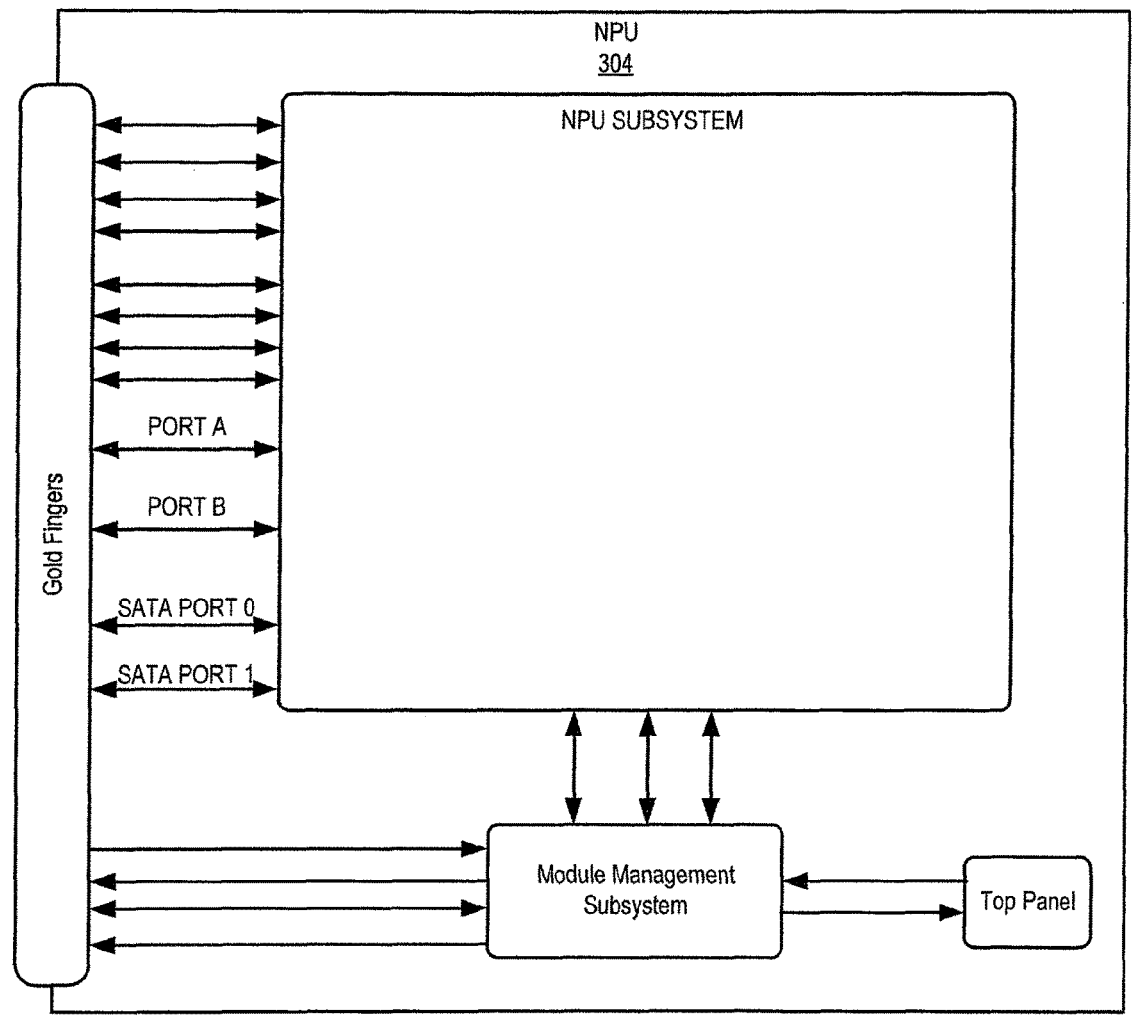
FIG. 4 illustrates an example of a network processing unit (NPU) for the IPS data plane module, according to an example of the present disclosure.

FIG. 4 illustrates an example of a NPU (e.g., the NPU 304) for the configurable network security apparatus 100, according to an example of the present disclosure. As described herein, the NPU may function, for example, as a packet processor to perform pattern matching, key lookup, computation, data bitfield manipulation, queue management, control processing, and quick allocation and re-circulation of packet buffers. For example, with respect to pattern matching, the NPU locates specific patterns of bits or bytes within packets in a packet stream. With respect to key lookup, the NPU undertakes a database lookup using a key to find a result, such as, for example, routing information. With respect to computation, the NPU performs computations related to the various functions described herein for the NPU. With respect to data bitfield manipulation, the NPU changes certain data fields contained in a packet as the packet is being processed. With respect to queue management, the NPU stores in queues packets that are received, processed and scheduled to be sent onwards. With respect to control processing, the NPU controls the operations related to processing of a packet. Lastly, the NPU performs quick allocation and re-circulation of packet buffers.

Figure 5:
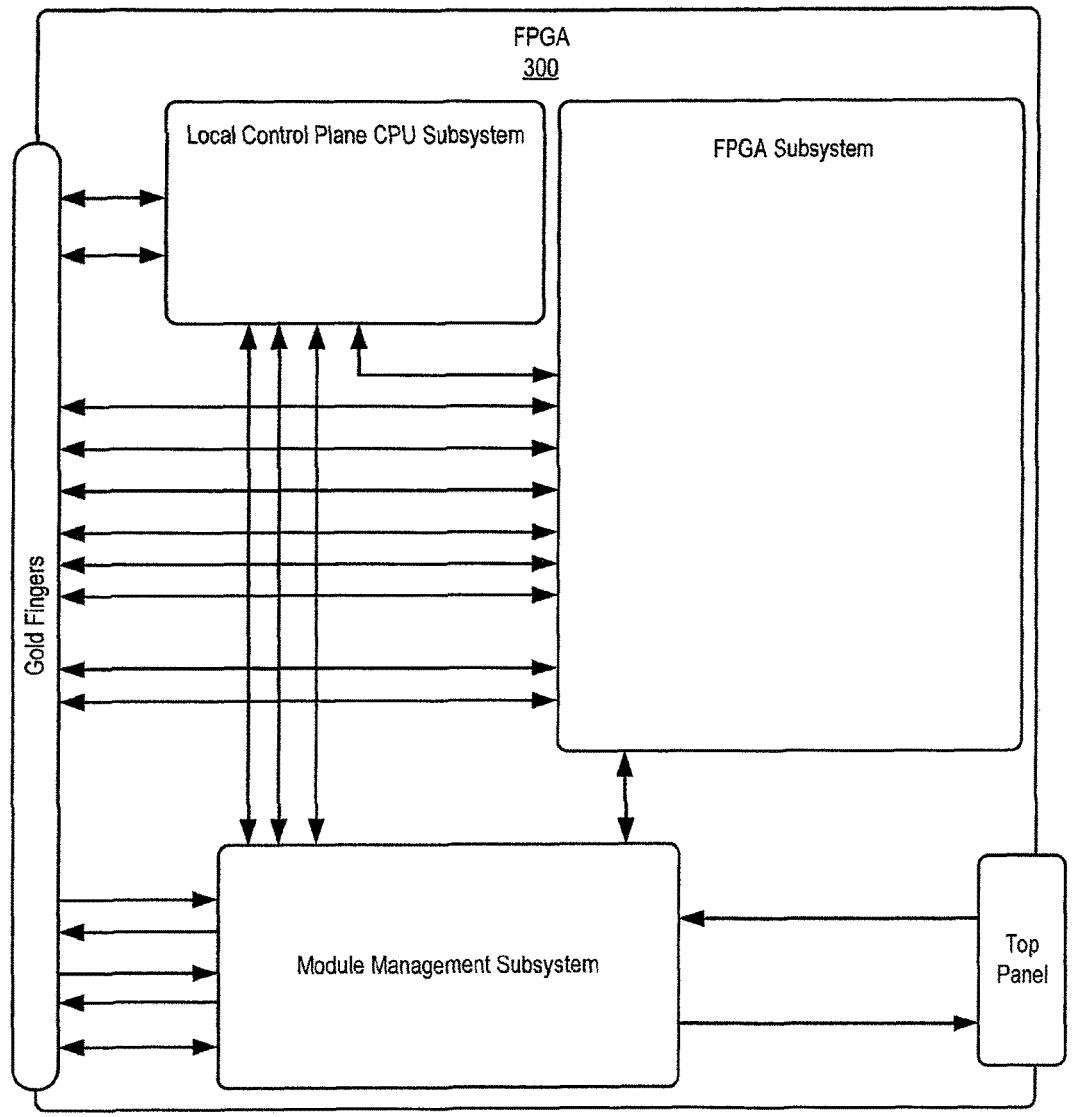
FIG. 5 illustrates an example of a field-programmable gate array (FPGA) for the IPS data plane module, according to an example of the present disclosure.

FIG. 5 illustrates an example of a FPGA (e.g., the FPGAs 300 or 302) for the configurable network security apparatus 100, according to an example of the present disclosure. As described herein, the FPGA may be configured by a user, for example, by manipulating the programmable logic components of the FPGA as needed.

Figure 6:
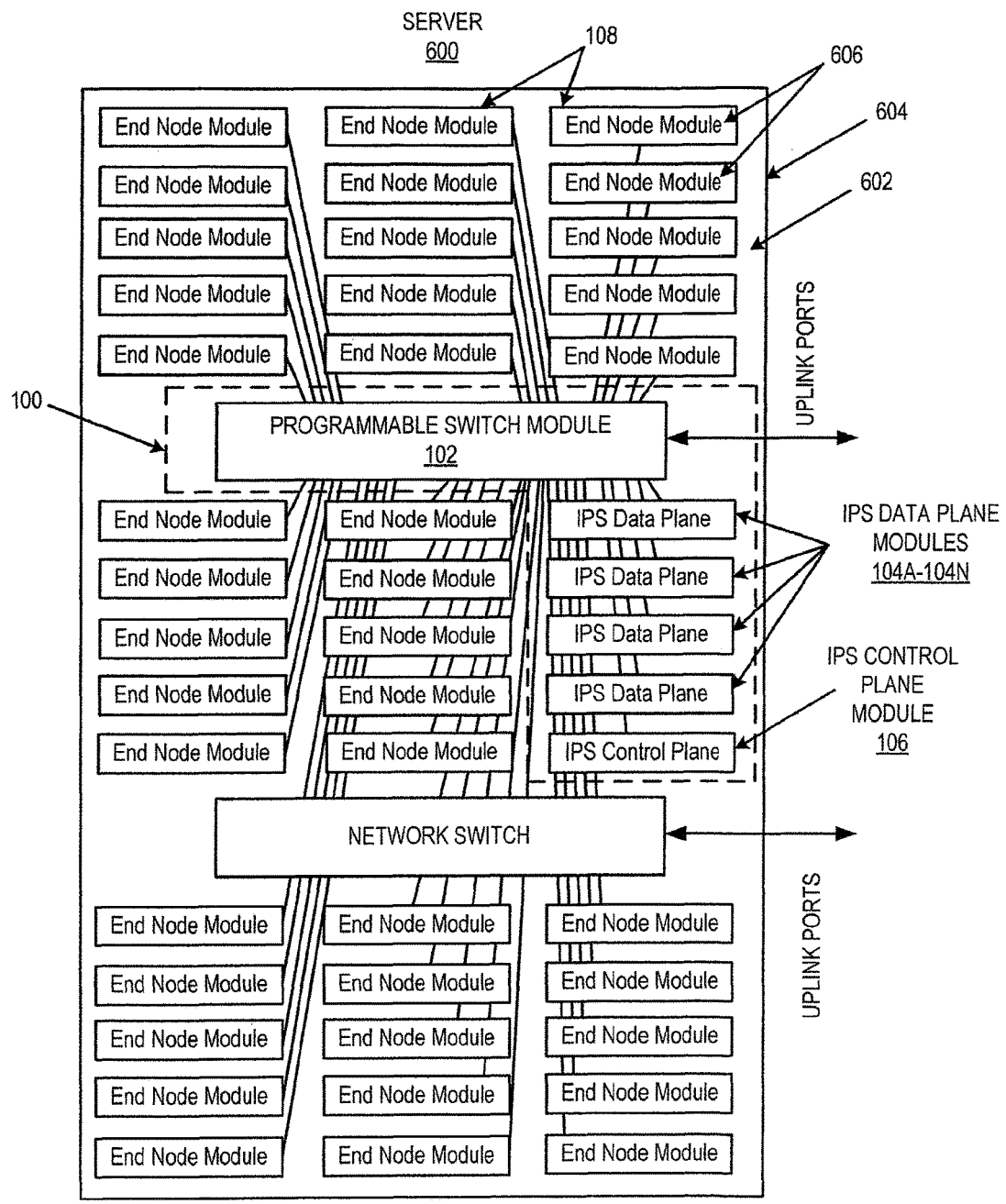
FIG. 6 illustrates an example of a server including the configurable network security apparatus of FIG. 1, according to an example of the present disclosure.

FIG. 6 illustrates an example of a server 600 including the configurable network security apparatus 100, according to an example of the present disclosure. The server 600 may include the apparatus 100 embedded into the backplane fabric 602 thereof. The server 600 may include a chassis 604 including a plurality of the slots that correspond to the slots 108 of FIG. 1. The slots 108 may be used for a plurality of end node modules 606 that may include, for example, CPU modules, graphics processing unit (GPU) modules, digital signal processing (DSP) modules, etc. The end node modules 606 may provide various functions, such as, for example, web server functionality, e-mail server functionality, etc. Similarly, the slots 108 may be used for a plurality of the IPS data plane modules 104A-104N and the IPS control plane module 106 of the apparatus 100. The CPU, GPU, and DSP modules, and further the IPS data plane modules 104A-104N and the IPS control plane module 106 may include a standard interface that includes the switched fabric of the programmable switch module 102, and storage and direct interconnect fabrics. For the server 600, the network security function may be implemented by the apparatus 100. Specifically, the network security function is implemented by the programmable switch module 102, the IPS data plane modules 104A-104N, and the IPS control plane module 106 that scale as described herein. Traffic may be directed to and from the IPS data plane modules 104A-104N via the programmable switch module 102. The IPS control plane module 106 may interact with the IPS data plane modules 104A-104N on an isolated network. For example, the IPS control plane module 106 interacts with the IPS data plane modules 104A-104N on a VLAN, or another type of physical isolation. The IPS control plane module 106 may also have access to the low level manageability subsystem in the server chassis.

When the configurable network security apparatus 100 boots up, the apparatus 100 may detect the number and type of modules that are installed for its use. For example, the IPS control plane module 106 detects the number of IPS data plane modules 104A-104N. The IPS control plane module 106 may use this inventory of the IPS data plane modules 104A-104N to program the backplane switch (i.e., the programmable switch module 102) within the server 600 to send traffic to load balance traffic across the installed IPS data plane modules 104A-104N. Thus, traffic entering the server 600 may be intercepted by the programmable switch module 102, and sent to the IPS data plane modules 104A-104N for inspection. If the traffic is malicious, the apparatus 100 may block the traffic, notify an administrator, or take other appropriate actions. If the traffic is benign, the apparatus 100 may return the traffic back to the programmable switch module 102, from where normal switching rules may cause the traffic to go to the proper end node module 606. The same mechanisms may also be used to intercept outgoing traffic from the server 600, or between different server modules (e.g., different end node modules 606).

The example of the configuration of FIG. 6 may provide use of a subset of the chassis slots of the server 600 for the IPS data plane modules 104A-104N and the IPS control plane module 106. The remaining slots may be used for other end node modules. In the example of FIG. 6, the programmable switch module 102 may provide IPS inspection for traffic to or from the uplinks to the end node modules. Based on the routing by the programmable switch module 102, the apparatus 100 may provide for uplink to server end node IPS protection, and server node to server node IPS protection. For example, referring to FIG. 6, the apparatus 100 may also provide IPS protection for traffic between adjacent servers 600. With respect to virtual servers that are implemented on a physical server, the apparatus 100 may also provide IPS protection for traffic between adjacent virtual servers. The apparatus 100 also implements network security for traffic to the server 600, between servers 600, and/or between the end node modules 606 without the final destination of the traffic having knowledge of the network security functionality.

The configurable network security apparatus 100 may use processes that have been developed in the context of a fixed function appliance and ported to the process defined hardware implementation for the configurable network security apparatus 100. For example, the apparatus 100 may use processes that have been developed in the context of a fixed function appliance and ported to implement the IPS data plane modules 104A-104N.

Figure 7:
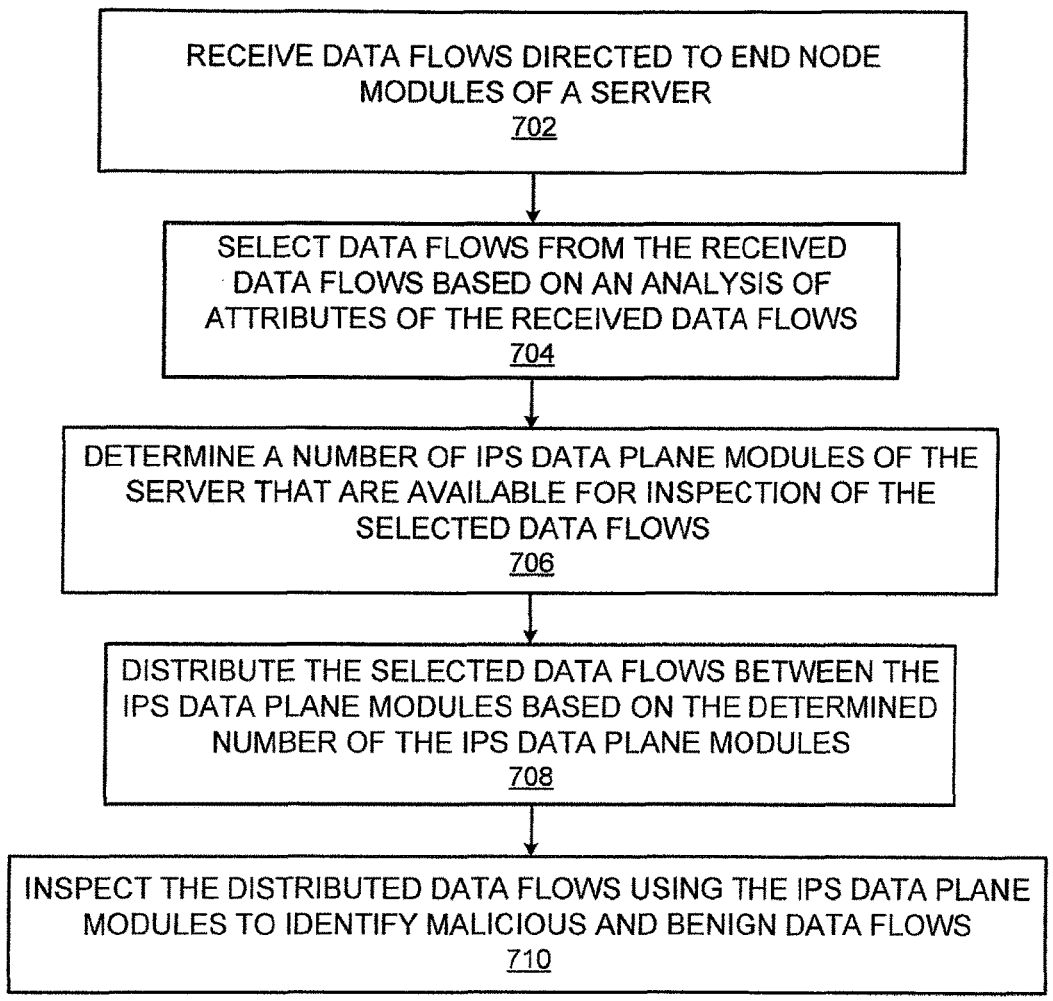
FIG. 7 illustrates a method for configurable network security, according to an example of the present disclosure.
Figure 8:
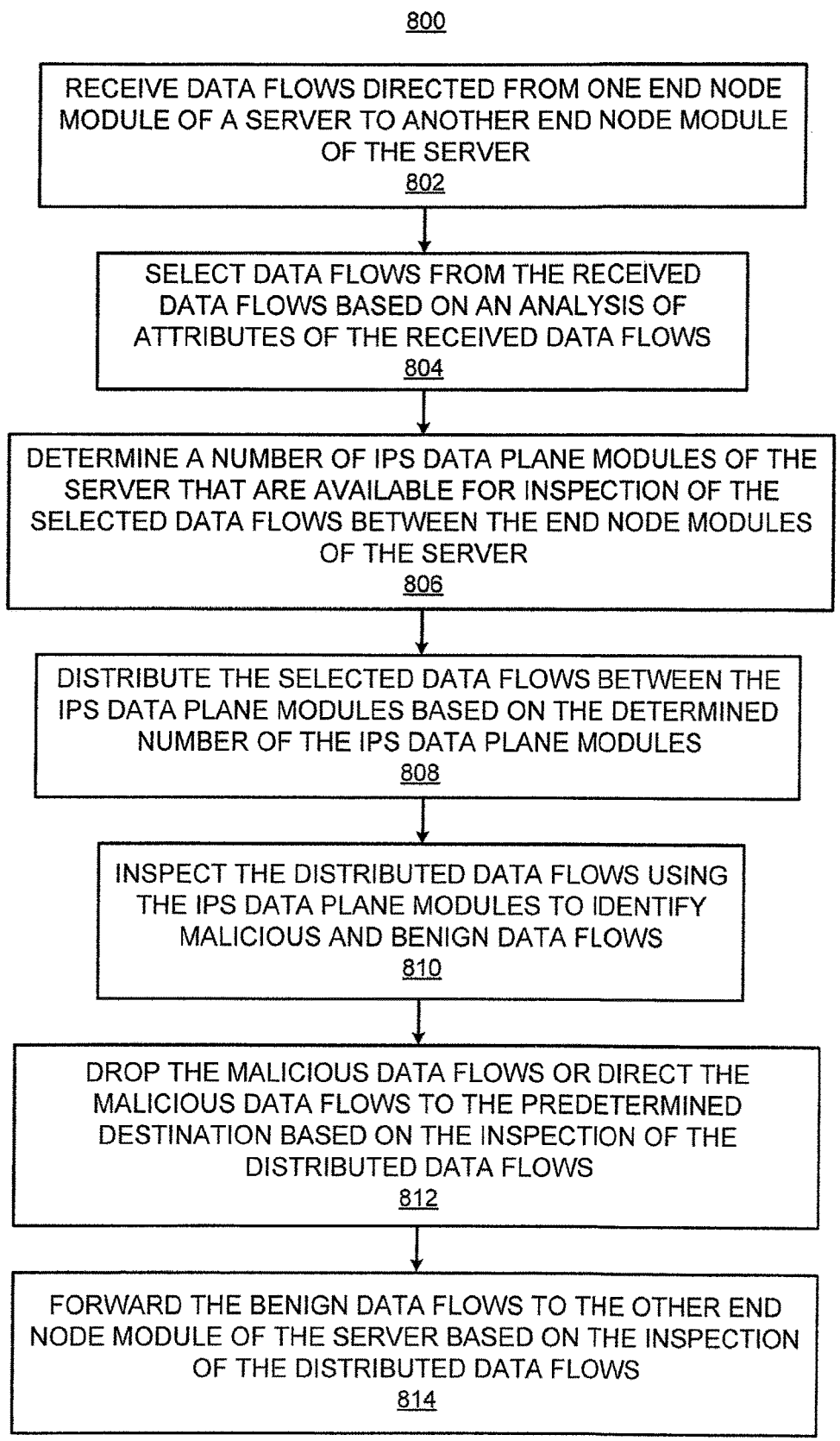
FIG. 8 illustrates further details of the method for configurable network security, according to an example of the present disclosure.

FIGS. 7 and 8 respectively illustrate flowcharts of methods 700 and 800 for configurable network security, corresponding to the example of the configurable network security apparatus 100 whose construction is described in detail above. The methods 700 and 800 may be implemented on the configurable network security apparatus 100 with reference to FIGS. 1-6 by way of example and not limitation. The methods 700 and 800 may be practiced in other apparatus.

Referring to FIG. 7, for the method 700, at block 702, the method may include receiving data flows directed to end node modules of a server. For example, referring to FIG. 1, the programmable switch module 102 receives data flows directed to end node modules of a server.

At block 704, the method may include selecting data flows from the received data flows based on an analysis of attributes of the received data flows. For example, referring to FIG. 1, the programmable switch module 102 analyzes the data flows based on attributes of the data flows, and redirects the data flows for processing by one of the IPS data plane modules 104A-104N based on the analysis. The attributes include, for example, source, destination, virtual local area network (VLAN), and/or other qualifiers. According to an example, the selected data flows are less than the received data flows. According to an example, selecting data flows from the received data flows based on an analysis of attributes of the received data flows may further include selecting a subset of the received data flows based on the analysis of the attributes of the received data flows for inspection by the IPS data plane modules 104A-104N, and preventing a remaining subset of the received data flows from being directed to the IPS data plane modules 104A-104N.

At block 706, the method may include determining a number of IPS data plane modules of the server that are available for inspection of the selected data flows. For example, referring to FIG. 1, the IPS control plane module 106 determines a number of IPS data plane modules 104A-104N of the server that are available for inspection of the selected data flows.

At block 708, the method may include distributing the selected data flows between the IPS data plane modules based on the determined number of the IPS data plane modules. For example, referring to FIG. 1, the programmable switch module 102 distributes the selected data flows between the IPS data plane modules 104A-104N based on the determined number of the IPS data plane modules 104A-104N.

At block 710, the method may include inspecting the distributed data flows using the IPS data plane modules to identify malicious and benign data flows, and to determine whether to drop the malicious data flows, direct the malicious data flows to a predetermined destination, or forward the benign data flows to the end node modules of the server. For example, referring to FIG. 1, the IPS data plane modules 104A-104N inspect the distributed data flows to identify malicious and benign data flows. Based on a policy for the apparatus 100, the IPS data plane modules 104A-104N determine whether to drop the malicious data flows, direct the malicious data flows to a predetermined destination, or forward the benign data flows to the end node modules of the server.

According to an example, the method 700 may further include dropping the malicious data flows or directing the malicious data flows to the predetermined destination based on the inspection of the distributed data flows. For example, referring to FIG. 1, the IPS data plane modules 104A-104N drop the malicious data flows or direct the malicious data flows to the predetermined destination based on the inspection of the distributed data flows. According to an example, dropping the malicious data flows based on the inspection of the distributed data flows further include separating incoming packets of the distributed data flows into a known disapproved category that includes packets that are to be dropped, and dropping the disapproved category packets. According to an example, directing the malicious data flows to the predetermined destination based on the inspection of the distributed data flows further includes separating incoming packets of the distributed data flows into a suspicious category that includes packets that need further inspection, and forwarding the suspicious category packets to a CPU module (e.g., the IPS control plane module 106) for further analysis.

According to an example, the method 700 may further include forwarding the benign data flows to the end node modules of the server based on the inspection of the distributed data flows. For example, referring to FIG. 1, the IPS data plane modules 104A-104N forward (via the programmable switch module 102) the benign data flows to the end node modules of the server based on the inspection of the distributed data flows. According to an example, forwarding the benign data flows to the end node modules of the server based on the inspection of the distributed data flows further includes separating incoming packets of the distributed data flows into a known approved category that includes packets that show no signs of containing attacks, and forwarding the approved category packets to the end node modules of the server.

According to an example, the method 700 may further include analyzing an amount of the received data flows, and indicating an increase or a decrease in the determined number of the IPS data plane modules based the analysis of the amount of the received data flows. For example, referring to FIG. 1, the IPS control plane module 106 analyzes an amount of the received data flows, and indicates an increase or a decrease in the determined number of the IPS data plane modules 104A-104N based the analysis of the amount of the received data flows.

Referring to FIG. 8, for the method 800, at block 802, the method may include receiving data flows directed from one end node module of a server to another end node module of the server. For example, referring to FIGS. 1 and 6, the programmable switch module 102 receives data flows directed from one end node module 606 of the server 600 to another end node module 606 of the server 600.

At block 804, the method may include selecting data flows from the received data flows based on an analysis of attributes of the received data flows. For example, referring to FIGS. 1 and 6, the programmable switch module 102 selects data flows from the received data flows based on an analysis of attributes of the received data flows.

At block 806, the method may include determining a number of IPS data plane modules of the server that are available for inspection of the selected data flows between the end node modules of the server. For example, referring to FIGS. 1 and 6, the IPS control plane module 106 determines a number of IPS data plane modules 104A-104N of the server 600 that are available for inspection of the selected data flows between the end node modules 606 of the server 600.

At block 808, the method may include distributing the selected data flows between the IPS data plane modules based on the determined number of the IPS data plane modules. For example, referring to FIGS. 1 and 6, the programmable switch module 102 distributes the selected data flows between the IPS data plane modules 104A-104N based on the determined number of the IPS data plane modules 104A-104N.

At block 810, the method may include inspecting the distributed data flows using the IPS data plane modules to identify malicious and benign data flows, and to determine whether to drop the malicious data flows, direct the malicious data flows to a predetermined destination, or forward the benign data flows to the other end node module of the server. For example, referring to FIGS. 1 and 6, the IPS data plane modules 104A-104N inspect the distributed data flows to identify malicious and benign data flows.

At block 812, the method may include dropping the malicious data flows or directing the malicious data flows to the predetermined destination based on the inspection of the distributed data flows.

At block 814, the method may include forwarding the benign data flows to the other end node module of the server based on the inspection of the distributed data flows.

Figure 9:
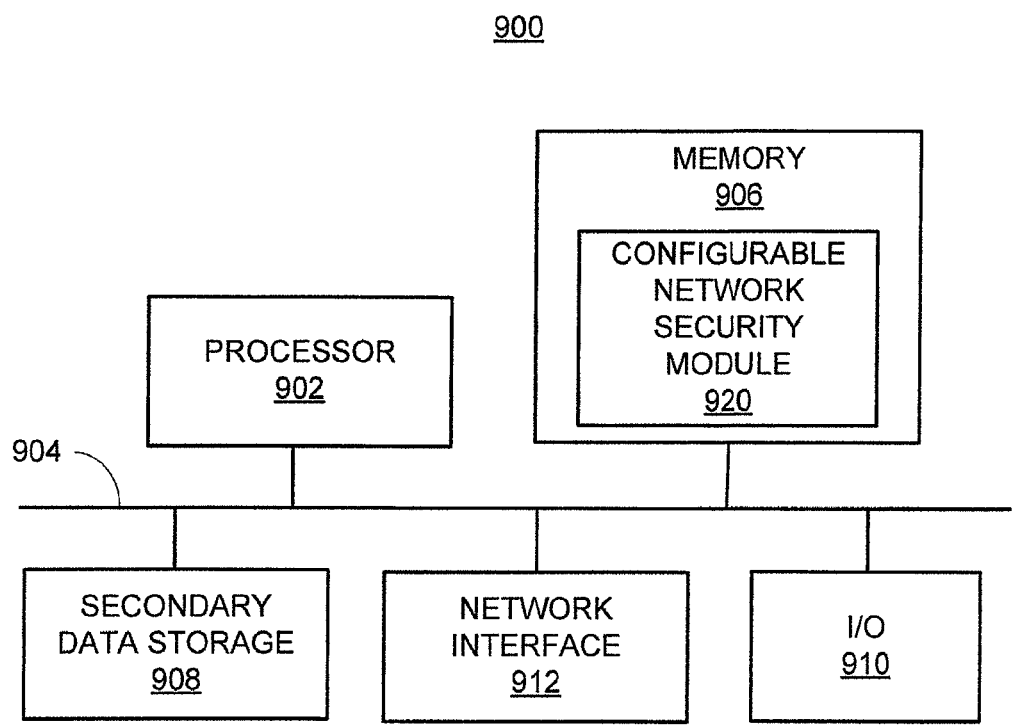
FIG. 9 illustrates a computer system, according to an example of the present disclosure.

FIG. 9 shows a computer system 900 that may be used with the examples described herein. The computer system 900 may represent a generic platform that includes components that may be in a server or another computer system. The computer system 900 may be used as a platform for the apparatus 100. The computer system 900 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 900 may include a processor 902 that may implement or execute machine readable instructions performing some or all of the methods, functions and other processes described herein. Commands and data from the processor 902 may be communicated over a communication bus 904. The computer system may also include a main memory 906, such as a random access memory (RAM), where the machine readable instructions and data for the processor 902 may reside during runtime, and a secondary data storage 908, which may be non-volatile and stores machine readable instructions and data. The memory and data storage are examples of computer readable mediums. The memory 906 may include a configurable network security module 920 including machine readable instructions residing in the memory 906 during runtime and executed by the processor 902. The configurable network security module 920 may include the modules of the apparatus 100 shown in FIG. 1.

The computer system 900 may include an I/O device 910, such as a keyboard, a mouse, a display, etc. The computer system may include a network interface 912 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A non-transitory computer readable medium having stored thereon machine readable instructions to provide configurable network security, the machine readable instructions, when executed, cause at least one processor of a server to:
   receive data flows directed to end node modules that are inserted into corresponding slots of a chassis of the server;
   select data flows from the received data flows based on an analysis of attributes of the received data flows, wherein the selected data flows are less than the received data flows;
   determine a number of intrusion prevention system (IPS) data plane modules that are inserted into corresponding slots of the chassis of the server and that are available for inspection of the selected data flows;
   distribute the selected data flows between the IPS data plane modules based on the determined number of the IPS data plane modules;
   inspect the distributed data flows using the IPS data plane modules to identify malicious, suspicious, and benign data flows;
   drop the malicious data flows;
   forward the benign data flows to the end node modules of the server; and
   forward the suspicious data flows for further inspection to a central processing unit (CPU) module that is inserted into a corresponding slot of the chassis of the server.

2. The non-transitory computer readable medium of claim 1, wherein each of the IPS data plane modules includes a network processing unit (NPU) module, and a field-programmable gate array (FPGA) module to implement configurable network security.

3. The non-transitory computer readable medium of claim 1, wherein to select data flows from the received data flows based on an analysis of attributes of the received data flows, the machine readable instructions, when executed, further cause the at least one processor to:
   select a subset of the received data flows based on the analysis of the attributes of the received data flows for inspection by the IPS data plane modules; and
   prevent a remaining subset of the received data flows from being directed to the IPS data plane modules.

4. The non-transitory computer readable medium of claim 1, wherein to drop the malicious data flows based on the inspection of the distributed data flows, the machine readable instructions, when executed, further cause the at least one processor to:
   separate incoming packets of the distributed data flows into a known disapproved category that includes packets that are to be dropped, and drop the disapproved category packets.

5. The non-transitory computer readable medium of claim 1, wherein to forward the benign data flows to the end node modules of the server based on the inspection of the distributed data flows, the machine readable instructions, when executed, further cause the at least one processor to:
   separate incoming packets of the distributed data flows into a known approved category that includes packets that show no signs of containing attacks, and forward the approved category packets to the end node modules of the server.

6. The non-transitory computer readable medium of claim 1, wherein the machine readable instructions, when executed, further cause the at least one processor to:
   analyze an amount of the received data flows; and
   indicate an increase or a decrease in the determined number of the IPS data plane modules based the analysis of the amount of the received data flows.

7. A configurable network security apparatus comprising:
   at least one processor;
   a plurality of intrusion prevention system (IPS) data plane modules for a data plane of the configurable network security apparatus, the IPS data plane modules being inserted into corresponding slots of a chassis of a server and are configured to provide network security for the server;
   a control plane module for a control plane of the configurable network security apparatus, the control plane module, executed by the at least one processor, to determine a number of the IPS data plane modules;
   a central processing unit (CPU) module that is inserted into a corresponding slot of the chassis of the server; and
   a programmable switch module, executed by the at least one processor, to receive data flows directed to end node modules that are inserted into corresponding slots of the chassis of the server, to select data flows from the received data flows based on an analysis of attributes of the received data flows, and to distribute the selected data flows between the IPS data plane modules based on the determined number of the IPS data plane modules, wherein the IPS data plane modules are configured to inspect the distributed data flows to identify malicious, suspicious, and benign data flows, and are configured to drop the malicious data flows, forward the benign data flows to the end node modules of the server, and forward the suspicious data flows to the CPU module for further inspection.

8. The configurable network security apparatus according to claim 7, wherein each of the IPS data plane modules includes a network processing unit (NPU) module, and a field-programmable gate array (FPGA) module to implement configurable network security.

9. The configurable network security apparatus according to claim 7, wherein the IPS data plane modules are removable cartridges.

10. A method for configurable network security, the method comprising:
- receiving data flows directed from a first end node module that is inserted into a first slot of a chassis of a server to a second end node module that is inserted into a second slot of the chassis of the server;
- selecting data flows from the received data flows based on an analysis of attributes of the received data flows;
- determining a number of intrusion prevention system (IPS) data plane modules of the server that are inserted into corresponding slots of the chassis of the server and that are available for inspection of the selected data flows between the first and second end node modules of the server;
- distributing the selected data flows between the IPS data plane modules based on the determined number of the IPS data plane modules;
- inspecting the distributed data flows using the IPS data plane modules to identify malicious and benign data flows, and to determine whether to drop the malicious data flows, direct the malicious data flows to a predetermined destination, or forward the benign data flows to the second end node module;
- one of dropping the malicious data flows and directing the malicious data flows to the predetermined destination based on the inspection of the distributed data flows; and
- forwarding the benign data flows to the second end node module of the server based on the inspection of the distributed data flows.

11. The method of claim 10, wherein selecting data flows from the received data flows based on an analysis of attributes of the received data flows further comprises:
- selecting a subset of the received data flows based on the analysis of the attributes of the received data flows for inspection by the IPS data plane modules; and
- preventing a remaining subset of the received data flows from being directed to the IPS data plane modules.

12. The method of claim 10, further comprising:
analyzing an amount of the received data flows; and
indicating an increase or a decrease in the determined number of the IPS data plane modules based the analysis of the amount of the received data flows.

* * * * *